Feb. 27, 1968     J. D. DAVIDSON ET AL     3,371,266
FIELD CIRCUIT CONTROL FOR ALTERNATING CURRENT GENERATORS
Filed Sept. 14, 1964     2 Sheets-Sheet 1

United States Patent Office 3,371,266
Patented Feb. 27, 1968

3,371,266
FIELD CIRCUIT CONTROL FOR ALTERNATING CURRENT GENERATORS
John D. Davidson, Irwin, and Franklin J. Murphy, Jr., Delmont, Pa., assignors to Westinghouse Electric Corporation, Pittsburgh, Pa., a corporation of Pennsylvania
Filed Sept. 14, 1964, Ser. No. 396,280
11 Claims. (Cl. 322—69)

ABSTRACT OF THE DISCLOSURE

A field circuit control system for alternating current generators which automatically removes field excitation when the generator slows down to a predetermined speed, thus preventing damage to the slip rings by flow of field current at low speed or at standstill when the generator is being shut down. The system includes means for distinguishing between acceleration and deceleration of the generator so that field excitation is maintained when the generator is being started.

---

The present invention relates to control of the field excitation circuit of an alternating current generator and, more particularly, to control means for effecting removal of field excitation from an alternating current generator at a predetermined speed when the generator is being shut down.

Synchronous alternating current machines usually have a field winding on the rotor which is supplied with direct current excitation by an exciter connected to the rotating field winding through slip rings. In the usual operation of large generators, the field excitation is removed when the machine is shut down by manually tripping a circuit breaker in the field circuit, or in the exciter field circuit, to deenergize the generator field circuit. This should be done while the generator is still rotating, and if the field excitation is not removed before the generator comes to rest, the relatively large field current flowing to the slip rings at very low speed or zero speed will result in burning and scoring of the slip rings and may cause serious damage. Since the field circuit breaker is usually tripped manually as part of the routine procedure of shutting the machine down, the possibility of failure to trip the breaker at the proper time always exists, and it is desirable to provide some means to insure that field excitation will always be removed at the proper time to prevent the possibility of damage to the slip rings.

It is accordingly the principal object of the present invention to provide a control means for alternating current generators which will insure removal of field excitation from the machine at a predetermined low speed before the generator reaches zero speed.

Another object of the invention is to provide a control system for alternating current generators which responds to the frequency of the machine and operates at a predetermined relatively low speed of the generator to automatically effect deenergization of the field circuit, or to provide a signal indicating that the field excitation should be removed, or both.

A further object of the invention is to provide a control system for alternating current generators which effects removal of field excitation at a predetermined low speed of the generator, and which is capable of distinguishing between acceleration and deceleration of the generator so that the field excitation is not removed when the generator is being started and accelerates through the predetermined speed but is reliably removed when the generator is being shut down.

Other objects and advantages of the invention will be apparent from the following detailed description taken in connection with the accompanying drawings, in which.

Figure 1:
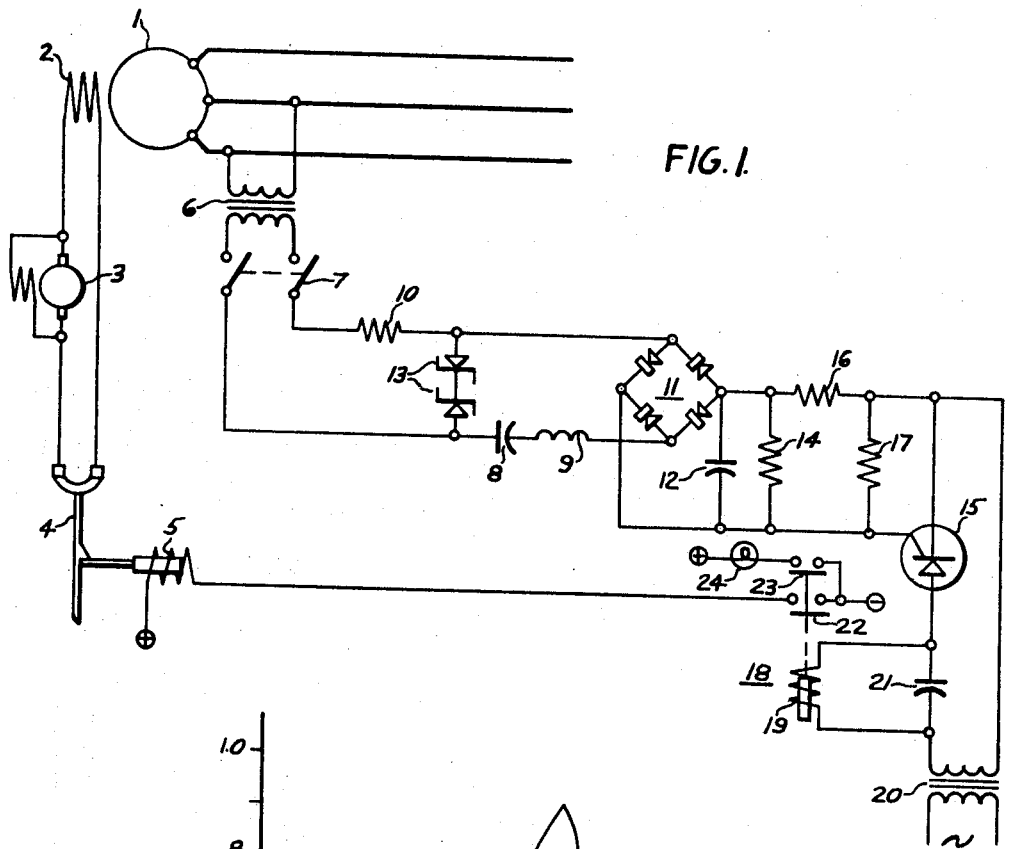
FIGURE 1 is a schematic diagram showing one embodiment of the invention.

An illustrative embodiment of the invention is shown in FIG. 1 for controlling the field excitation circuit of an alternating current generator 1. The generator 1 is shown as a three-phase generator having a field winding 2 supplied with direct current excitation from an exciter 3. The generator 1 may be of any usual construction and the field winding 2 is disposed on the rotor and supplied with direct current excitation through slip rings in the usual manner. The exciter 3 may be of any usual or suitable type and is shown as a direct current generator. A circuit breaker 4 is connected between the exciter 3 and the field winding 2 to control the field excitation circuit. The field circuit breaker 4 is shown for simplicity as being connected in the generator field circuit but it will be understood that it could equally well be connected in the exciter field circuit to effect deenergization of the generator field circuit when the breaker is tripped. The field circuit breaker 4 may be of any suitable type and is shown as having a trip coil 5 which is automatically controlled as hereinafter described. The break 4 may also be provided with any other desired closing and tripping means either manually or automatically operated.

In accordance with the present invention, a control circuit is provided for tripping the field circuit breaker 4 at a predetermined speed of the generator to effect deenergization of the generator field circuit before the generator reaches zero speed when it is being shut down. The control circuit includes a frequency responsive means which is energized from the generator voltage to respond to the frequency of the generator, which is of course proportional to the speed. As shown in FIG. 1, the frequency responsive means is energized by a transformer 6 connected across one phase of the generator 1 with its secondary winding connected to the control circuit through a switch 7 which may be manually or automatically operated. The frequency responsive means comprises a tuned circuit consisting of a capacitor 8 and an inductance 9 connected in series and selected so as to be in series resonance at a predetermined frequency corresponding to a relatively low speed of the generator. Thus, for example, the values of the capacitor 8 and inductance 9 may be chosen so that the circuit is tuned to series resonance at a frequency of six cycles per second, corresponding to a speed of 360 r.p.m. for a two-pole machine. The tuned circuit 8, 9 is energized from the secondary winding of the transformer 6, preferably through a resistor 10, and is connected to a full wave rectifier bridge 11 as shown, a capacitor 12 being connected across the output of the rectifier bridge to smooth the direct current output. A pair of oppositely connected Zener diodes 13 are connected across the transformer 6 to break down on opposite half-cycles of the alternating current voltage and provide a substantially constant voltage to the tuned circuit 8, 9.

A resistor 14 is connected across the direct current output terminals of the rectifier bridge 11. It will be seen that at frequencies substantially above the frequency for which the resonant circuit is tuned a relatively low current will flow through the resistor 14, but as the resonant frequency is approached the current will sharply increase and the voltage across the resistor 14 will correspondingly increase. This voltage is used to control a static switching device shown as a silicon controlled rectifier 15. The voltage across the resistor 14 is applied to the gate electrode of the controlled rectifier 15 through resistors 16 and 17 and causes the controlled rectifier to become conductive when the voltage of the resistor 14 reaches the necessary value to fire the controlled rectifier 15.

The controlled rectifier 15 is used to actuate a control device of any suitable type, shown as a relay 18 having an operating coil 19 which is connected in series with the anode and cathode electrodes of the controlled rectifier 15 across the secondary winding of a transformer 20 which may be energized from any suitable source of low voltage control power. A capacitor 21 is preferably connected across the relay coil 19 to prevent chattering of the relay on the non-conductive half-cycles of the controlled rectifier 15.

The relay 18 may be utilized in any desired manner to control the circuit breaker 4 to deenergize the generator field circuit. As shown in FIG. 1 for the purpose of illustration, the relay 18 has a normally open contact 22 which closes when the relay is energized to complete an energizing circuit for the trip coil 5 of the circuit breaker 4 to trip the breaker and interrupt the generator field circuit. The relay may also have a contact 23 which closes when the relay operates to complete an energizing circuit for a signal lamp 24 to provide a visual signal or indication that the field breaker should be tripped. It will be understood that automatic operation of the field circuit breaker 4 may be provided in the manner shown, or in any other desired manner, or the relay 18 might be used to energize a signal 24 which may be of any type, either visual or audible. If desired both a visual or audible signal and automatic operation may be provided as shown.

Figure 2:
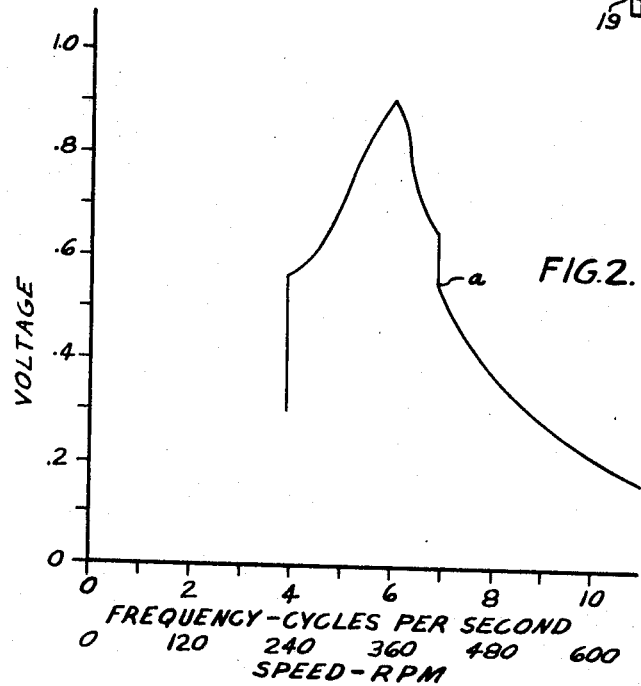
FIG. 2 is a curve illustrating the operation of the circuit of FIG. 1.

The operation of this control system should now be apparent. When the generator 1 is being shut down the switch 7 is closed either manually or automatically to energize the tuned circuit from the generator voltage. At generator speeds near the normal operating speed the frequency is relatively high and a very low voltage appears across the resistor 14. As the generator decelerates the frequency decreases, and when it approaches the frequency for which the resonant circuit is tuned, the voltage across the resistor 14 rapidly increases as shown in FIG. 2, which shows the gate voltage applied to the controlled rectifier 15 plotted against the frequency and the corresponding generator speed. In the particular embodiment shown in FIG. 2, the circuit 8, 9 was tuned to resonance at six cycles per second, and it will be seen that as the frequency approaches this value, the voltage rises very sharply and in the particular embodiment shown, the controlled rectifier 15 fired at the point $a$ corresponding to a frequency of approximately 6.9 cycles per second. When the rectifier 15 fires and becomes conductive, the relay 18 is energized and closes its contacts to effect interruption of the generator field circuit as described above.

As indicated above, the switch 7 must be closed to energize the frequency responsive circuit when the generator is being shut down. This may be done manually but is preferably done automatically by means of a signal obtained from the control systems for the turbine (not shown) which drives the generator 1. Thus, the turbine control may be utilized to provide a signal for actuating the switch 7 whenever the turbine throttle valve is closed so that steam is not being admitted to the turbine. In this way whenever the generator 1 is to be shut down and steam is shut off from the turbine, the switch 7 is closed and the field excitation control circuit is energized.

In many cases, however, the nature of the turbine control system is such that a signal of the desired kind cannot be obtained for actuation of the switch 7. In such cases it would be necessary to rely on manual closing of the switch 7 at the proper time, which is inherently unreliable, or to provide for the switch 7 to be closed whenever the generator is below its normal operating speed. Such an arrangement would not be satisfactory, however, because the switch 7 would then be closed when the generator 1 is being started as well as when it is being shut down. The control system would then operate at the predetermined speed to trip the field breaker when the machine accelerates through this speed on starting and this, of course, is not permissible.

Figure 3:
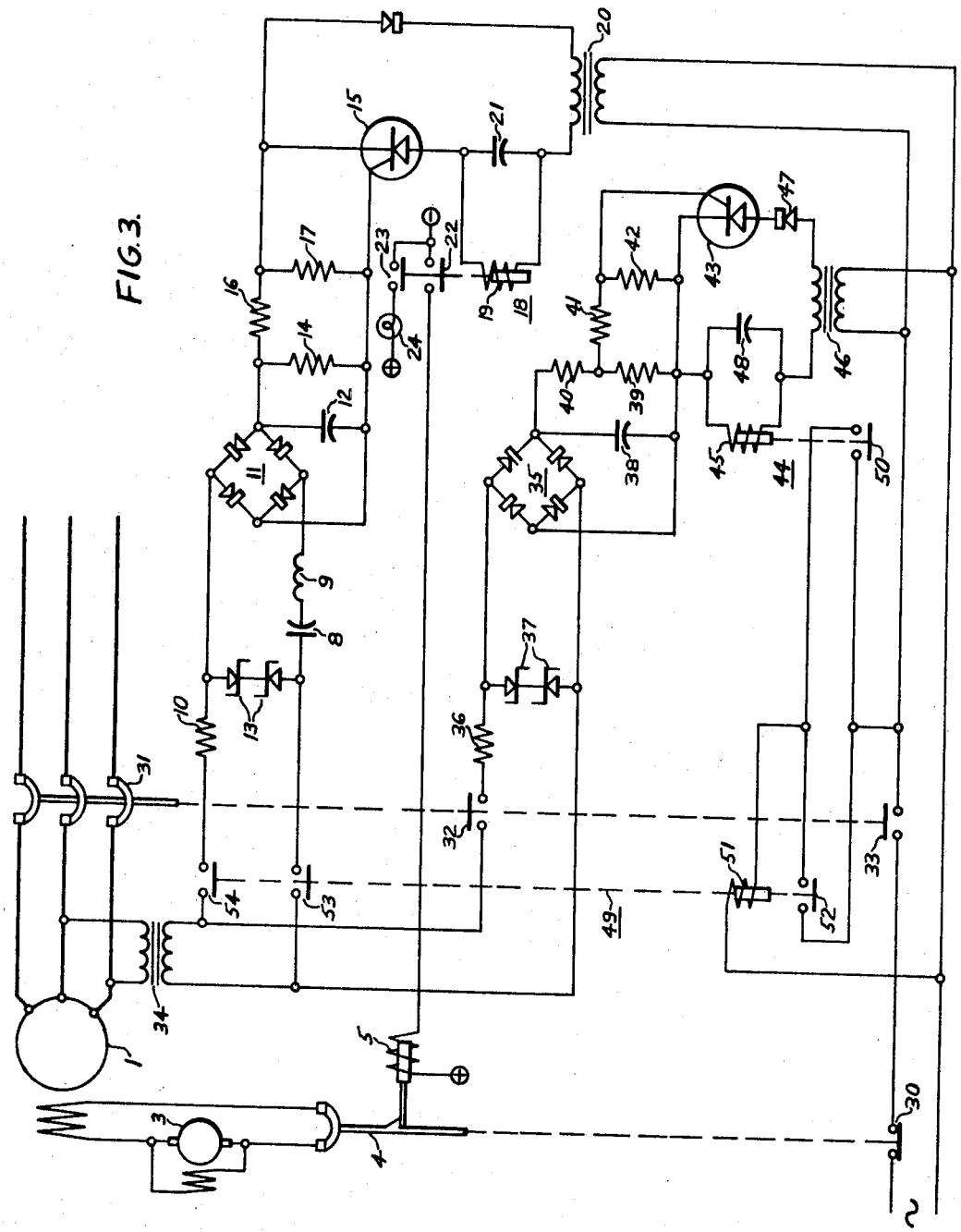
FIG. 3 is a schematic diagram showing a further embodiment of the invention.

FIG. 3 shows a further embodiment of the invention which automatically energizes the control circuit without requiring any signal from the turbine control, or other external signal, and which is capable of distinguishing between acceleration and deceleration of the generator so that the control is effective to trip the field circuit breaker at a predetermined speed during deceleration of the generator but is ineffective during acceleration.

In FIG. 3, the generator 1 and exciter 3 may be the same as previously described, and the generator field circuit is controlled in the same manner by a field circuit breaker 4 having a trip coil 5. The field breaker 4 is shown in this embodiment as having an auxiliary contact 30 which is closed when the field breaker is closed. The generator 1 is shown as being connected to a line by means of a main generator circuit breaker 31, of any suitable type, which has auxiliary contacts 32 and 33 which open when the breaker 31 closes.

The frequency responsive means and associated control circuit of FIG. 3 may be identical to the circuit shown and described in connection with FIG. 1, and the corresponding elements of the circuit have been designated by the same reference numerals in FIG. 3. The frequency responsive circuit is energized by the generator voltage in the manner previously described from a transformer 34 connected across one phase of the generator 1. As before, the tuned circuit 8, 9 is tuned to a frequency corresponding to the generator speed at which it is desired to trip the field breaker which may, for example, be seven cycles per second corresponding to a generator speed of 420 r.p.m. for a two-pole machine.

In this embodiment of the invention, a speed responsive circuit is also provided to control the connection of the tuned circuit to the generator voltage. The speed responsive circuit is shown as including a full wave rectifier bridge 35 which is connected to the transformer 34 through a resistor 36 and the auxiliary contact 32 of the generator breaker 31. A pair of oppositely connected Zener diodes 37 are preferably connected across the rectifier bridge 35 to limit the voltage applied to the rectifier bridge and thus protect the rectifier diodes. A filter capacitor 38 is preferably connected across the direct current output terminals of the rectifier bridge 35 and the direct current output is connected across two resistors 39 and 40 which function as a voltage divider. The voltage of the resistor 39 is applied through resistors 41 and 42 to the gate electrode of a silicon controlled rectifier 43.

At relatively low speeds of the generator 1 the generator voltage is substantially proportional to the speed of the generator, and at voltages below the breakdown voltage of the protective Zener diodes 37 a voltage will appear across the resistor 39 which is proportional to the generator speed and which is utilized to fire the controlled rectifier 43 at a predetermined speed of the generator. The resistors 39 and 40 are selected so that the voltage across the resistor 39 reaches the value required to fire the controlled rectifier 43 at a generator speed which is somewhat higher than the speed corresponding to the frequency for which the circuit 8, 9 is tuned. Thus, for example, if the tuned circuit is tuned to a frequency of seven cycles per second, corresponding to 420 r.p.m., the resistors 39 and 40 are selected so that the controlled rectifier 43 is fired at a generator voltage corresponding to a speed of from 450 to 480 r.p.m.

The controlled rectifier 43 is used to control a relay 44 which has an operating coil 45 connected in series with the anode and cathode of the controlled rectifier 43 across the secondary of a transformer 46, preferably in series with a diode 47. A capacitor 48 is preferably connected across the relay coil 45 to prevent chattering of the relay. The primary winding of the transformer 46 is connected in parallel with the transformer 20 to a suitable source of low voltage alternating current control power through the auxiliary contact 30 of the field circuit breaker 4 and the auxiliary contact 33 of the main generator breaker 31.

The relay 44 is used to control the energization of a second relay 49. For this purpose the contact 50 of the relay 44 is connected in series with the operating coil 51 of the relay 49 across the control power source as shown. When the relay 44 is energized and closes its contact 50, the relay 49 is energized and closes a contact 52 which completes a sealing circuit to maintain the energization of the relay 49. The relay 49 also has contacts 53 and 54 connected as shown between the tuned circuit 8, 9 and the transformer 34 to control the connection of the tuned circuit to the generator voltage.

In the operation of this control circuit, when the generator 1 is being started and is accelerating from standstill, the field breaker 4 will be closed to provide excitation for the generator and the main breaker 31 will be open. Thus, the auxiliary contacts 30 and 33 will both be closed and the transformers 20 and 46 will be energized. The contacts 53 and 54 are open, however, so that the tuned circuit is not energized. As the generator accelerates, the voltage across the resistor 39 increases and when the generator reaches the predetermined speed of 450 r.p.m. in the illustrative example, the controlled rectifier 43 is fired and energizes the relay 44 to close its contact 50. This energizes the relay 49, as previously described, which closes its contact 52 to hold the relay in and closes the contacts 53 and 54 to energize the tuned circuit from the transformer 34. Since the speed of the generator at this point is well above the speed corresponding to the frequency for which the circuit 8, 9 is tuned, the field breaker 4 will not be tripped and the generator can continue its normal starting operation. If, for any reason, the generator does not continue to accelerate and starts to slow down, the relay 44 drops out but the relay 49 remains energized, with its contacts 53 and 54 closed, and the tuned circuit operates in the manner previously described to trip the field breaker 4. If the generator continues to accelerate in the normal manner, however, the breaker 4 is not tripped and when the generator reaches its normal speed and is connected to the line by closing the main breaker 31, the auxiliary breaker contacts 32 and 33 open and deenergize the entire control circuit so that both relays 44 and 49 are deenergized. The relay contacts 53 and 54 are thus opened to disconnect the tuned circuit, and the transformers 20 and 46 are deenergized during normal operation of the generator.

When the generator 1 is to be shut down and the main breaker 31 is opened, the auxiliary contacts 32 and 33 close to energize the speed responsive circuit and the transformers 20 and 46. The generator voltage at this time will be close to its normal value and the controlled rectifier 43 will be fired as described above and the relays 44 and 49 will be energized, closing the contacts 53 and 54. As the generator decelerates its voltage decreases, and when the generator reaches the predetermined speed of 450 r.p.m., for example, the controlled rectifier 43 will cease to conduct and relay 44 will drop out. The relay 49, however, remains energized through the sealing contact 52 so that the tuned circuit remains energized through contacts 53 and 54, and when the lower speed for which the circuit 8, 9 is tuned is reached, the frequency responsive circuit will operate in the manner previously described to trip the field circuit breaker 4. This removes field excitation from the generator and at the same time the auxiliary contact 30 opens and deenergizes the control circuit.

Thus, in this embodiment of the invention, the control circuit distinguishes between acceleration and deceleration of the generator and effects deenergization of the generator field circuit at a predetermned speed when the machine is decelerating but is ineffective when the machine is accelerating. A self-contained control circuit is provided which does not require an energizing signal from an outside source but which automatically energizes itself at the proper time and is deenergized when it is not needed or when operation is not desired.

It should now be apparent that a control circuit has been provided for reliably and positively effecting deenergization of the field circuit of an alternating current generator at a predetermined low speed when the generator is being shut down. The use of this circuit thus reliably prevents any possibility of damage to the slip rings by the continued flow of excitation current at low or zero speed of the generator. Certain particular embodiments of the invention have been shown and described for the purpose of illustration, but it will be understood that various modifications and other embodiments are possible and all such alternative embodiments are within the scope of the invention.

We claim as our invention:

1. In a control system for an alternating current generator having a field excitation circuit, tuned circuit means energized from the generator, a semiconductor switching device having a gate electrode, means for deriving a unidirectional voltage from said tuned circuit means and for applying said voltage to said gate electrode to cause the semiconductor switching device to become conducting when the frequency of the generator falls below a predetermined value, and relay means energized when the switching device becomes conductive for effecting deenergization of said field excitation circuit.

2. In a control system for an alternating current generator having a field excitation circuit, means for deriving a substantially constant voltage from the generator voltage, a tuned circuit connected to be energized by said derived voltage, means for obtaining a unidirectional voltage proportional to the current in the tuned circuit, said unidirectional voltage having a maximum value at a predetermined frequency of the generator voltage, a semiconductor switching device having a gate electrode, means for applying said unidirectional voltage to the gate electrode to cause the switching device to become conductive when the unidirectional voltage approaches its maximum value, and relay means controlled by said switching device to effect deenergization of said field excitation circuit when the switching device becomes conductive.

3. In a control system for an alternating current generator having a field excitation circuit, frequency responsive means adapted to respond to the frequency of the generator, means responsive to the speed of the generator for effecting connection of the frequency responsive means to be energized by the generator voltage, said speed responsive means being operative to effect said connection of the frequency responsive means only when the generator speed exceeds a predetermined speed and to thereafter maintain said connection at any generator speed, and a control device actuated by said frequency responsive means when the frequency of the generator falls below a value corresponding to a speed less than said predetermined speed.

4. In a control system for an alternating current generator having a field excitation circuit, frequency responsive means adapted to respond to the frequency of the generator, means responsive to the speed of the generator for effecting connection of the frequency responsive means to be energized by the generator voltage, said speed responsive means being operative to effect said connection of the frequency responsive means only when the generator speed exceeds a predetermined speed and to thereafter maintain said connection at any generator speed, and control means actuated by said frequency responsive means for effecting deenergization of said field excitation circuit when the frequency of the generator falls below a value corresponding to a speed less than said predetermined speed.

5. In a control system for an alternating current generator having a field excitation circuit, frequency responsive means adapted to respond to the frequency of the generator, means responsive to the speed of the generator for effecting connection of the frequency responsive means to be energized by the generator voltage, said speed responsive means being operative to effect said connection of the frequency responsive means only when the generator speed exceeds a predetermined speed and to thereafter maintain said connection at any generator speed, semiconductor switching means actuated by said frequency responsive means when the frequency of the generator falls below a value corresponding to a speed less than said predetermined speed, and a control device responsive to actuation of said semiconductor switching means.

6. In a control system for an alternating current generator having a field excitation circuit, frequency responsive means adapted to respond to the frequency of the generator, speed responsive means including means for sensing the voltage of the generator and relay means operative only when the generator voltage exceeds a value corresponding to a predetermined speed to effect connection of the frequency responsive means to be energized by the generator voltage and to maintain said connection thereafter at any generator speed, and a control device actuated by said frequency responsive means when the frequency of the generator falls below a value corresponding to a speed less than said predetermined speed.

7. In a control system for an alternating current generator having a field excitation circuit, frequency responsive means adapted to respond to the frequency of the generator, speed responsive means including means for sensing the voltage of the generator and relay means operative only when the generator voltage exceeds a value corresponding to a predetermined speed to effect connection of the frequency responsive means to be energized by the generator voltage and to maintain said connection thereafter at any generator speed, and control means actuated by said frequency responsive means for effecting deenergization of said field excitation circuit when the frequency of the generator falls below a value corresponding to a speed less than said predetermined speed.

8. In a control system for an alternating current generator having a field excitation circuit, frequency responsive means adapted to respond to the frequency of the generator, means for sensing the voltage of the generator, a first relay, means controlled by the voltage sensing means for effecting operation of the first relay when the generator voltage exceeds a value corresponding to a predetermined speed, a second relay operative in response to operation of the first relay to effect connection of said frequency responsive means to be energized by the generator voltage and to thereafter maintain said connection, and a control device actuated by said frequency responsive means when the frequency of the generator falls below a value corresponding to a speed less than said predetermined speed.

9. In a control system for an alternating current generator having a field excitation circuit, frequency responsive means adapted to respond to the frequency of the generator, means for sensing the voltage of the generator, a first relay, means controlled by the voltage sensing means for effecting operation of the first relay when the generator voltage exceeds a value corresponding to a predetermined speed, a second relay operative in response to operation of the first relay to effect connection of said frequency responsive means to be energized by the generator voltage and to thereafter maintain said connection, and control means actuated by said frequency responsive means for effecting deenergization of said field excitation circuit when the frequency of the generator falls below a value corresponding to a speed less than said predetermined speed.

10. In a control circuit for an alternating current generator having a field excitation circuit, frequency responsive means adapted to respond to the frequency of the generator, means for sensing the voltage of the generator, a first relay, means controlled by the voltage sensing means for effecting operation of the first relay when the generator voltage exceeds a value corresponding to a predetermined speed, a second relay operative in response to operation of the first relay to effect connection of said frequency responsive means to be energized by the generator voltage and to thereafter maintain said connection, semiconductor switching means actuated by said frequency responsive means when the frequency of the generator falls below a value corresponding to a speed less than said predetermined speed, and a control device responsive to actuation of said semiconductor switching means.

11. In a control system for an alterating current generator having a field excitation circuit, tuned circuit means adapted to respond to the frequency of the generator, means for sensing the voltage of the generator, a first relay, means controlled by the voltage sensing means for effecting operation of the first relay when the generator voltage exceeds a value corresponding to a predetermined speed, a second relay operative in response to operation of the first relay to effect connection of said tuned circuit means to be energized by the generator voltage and to thereafter maintain said connection, a semiconductor switching device having a gate electrode, means for deriving a unidirectional voltage from said tuned circuit means and for applying said voltage to said gate electrode to cause the semiconductor switching device to become conducting when the frequency of the generator falls below a value corresponding to a speed less than said predetermined speed, and control means energized when the switching device becomes conductive for effecting deenergization of said field excitation circuit.

References Cited
UNITED STATES PATENTS

| | | | |
|---|---|---|---|
| 2,542,638 | 2/1951 | Desch | 322—32 X |
| 2,885,568 | 5/1959 | Reeder et al. | 322—69 X |
| 2,885,569 | 5/1959 | Schoh et al. | 322—69 X |
| 2,977,511 | 3/1961 | Reeder et al. | 322—69 X |
| 2,998,551 | 8/1961 | Moakler | 322—32 X |

MILTON O. HIRSHFIELD, *Primary Examiner.*

J. D. TRAMMELL, *Assistant Examiner.*